United States Patent
Campbell

[11] 3,776,027
[45] Dec. 4, 1973

[54] PROBE MOUNTING STRUCTURE
[75] Inventor: John M. Campbell, Jeannette, Pa.
[73] Assignee: Carrier Corporation, Syracuse, N.Y.
[22] Filed: July 24, 1972
[21] Appl. No.: 274,155

[52] U.S. Cl. .................................. 73/70, 73/71.4
[51] Int. Cl. ............................................ G01h 1/00
[58] Field of Search ...................... 73/70, 71.3, 71.4

[56] References Cited
UNITED STATES PATENTS
3,512,402    5/1970    Foster .................................. 73/71.4
3,316,756    5/1967    Hickman ............................. 73/71.4

Primary Examiner—James J. Gill
Attorney—J. Raymond Curtin

[57] ABSTRACT

A probe support structure fixed to the machine casing includes a base member having an enclosure and a tubular member extending inwardly of the casing toward a rotating member journaled for high speed rotation in the casing. The tubular member has communication with the enclosure and a probe holder is mounted in the inner end of the tubular member for axial movement therein toward and from the rotating member. Mechanism is mounted in the enclosure and is operable to adjust the probe holder axially of the tubular member. The adjusting mechanism includes a resilient member attached to the probe holder and extending lengthwise of the tubular member. The resilient member is normally of linear form but is deflectable to curved form for withdrawal from the enclosure together with the probe holder.

5 Claims, 8 Drawing Figures

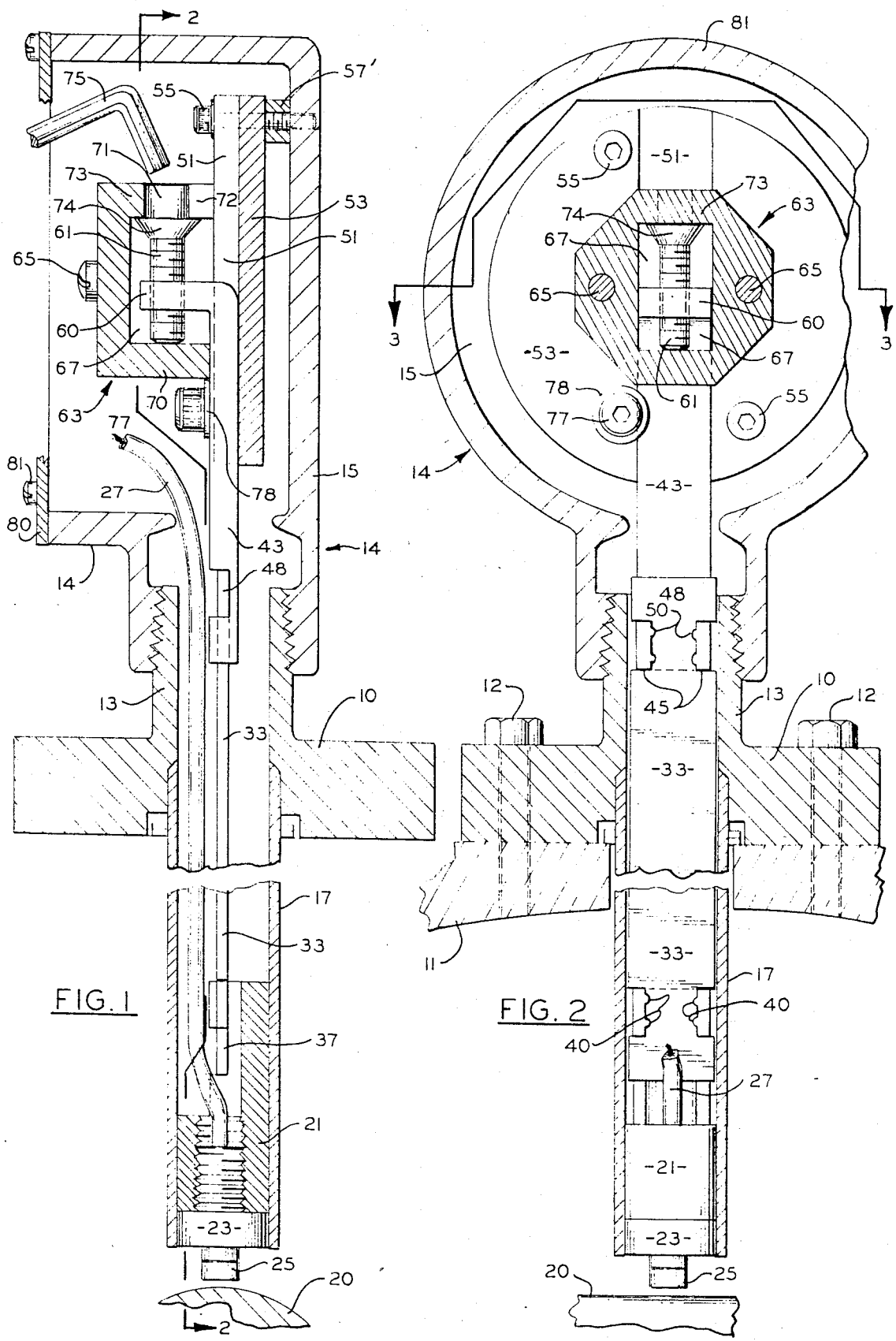

3,776,027

PROBE MOUNTING STRUCTURE

BACKGROUND OF THE INVENTION

Probes are provided in machines having components rotating at high speed such as turbines and rotary compressors. The probes serve to detect the development of a situation likely to cause damage to the machine, such, for example, the shifting of the rotating part or component from normal operating position or the development of vibration of an undesirable magnitude.

There are many structural arrangements for mounting probes in such machines including probes employed to detect vibration. It is necessary that the probe can be adjusted exteriorly of the machine casing toward and from the rotating part, and be removed and replaced. Also, it is desirable that such operations can be performed while the machine is in operation. Conventionally, such mounting structures include a rigid probe supporting support which precludes mounting the vibration probe in an area where a portion or component of a machine is situated to present a close overhead clearance to the exterior of the probe supporting structure whereby the rigid probe support or rigid probe adjusting mechanism cannot be removed axially from the machine casing. If the probe support structure includes means for adjusting the probe to place it in proper spaced relation to the rotating part of the machine, it is desirable to arrange such adjusting mechanism in a protective closure with the result that it is difficult, if not impossible, to effect withdrawal of the probe from the machine without first dismantling or disassembling the enclosure structure.

This invention has as an object a probe mounting structure embodying an arrangement permitting the probe to be conveniently withdrawn from the machine casing from a location having a close overhead clearance or where the probe adjusting mechanism is mounted in an enclosure.

SUMMARY OF THE INVENTION

A probe support structure includes a base portion fixedly mounted on the machine casing and an enclosure. The support structure also includes a tubular member extending inwardly from the base portion and having communication with the enclosure. A probe holder is mounted in the inner end of the tube for axial movement therein toward and from the rotating part. A probe is secured in the probe holder.

Means for adjusting the probe holder is operable in the enclosure and includes an elongated resilient member connected to the probe holder and extending lengthwise in the tube. The resilient member is normally of linear form but may be deflected to curved form to permit withdrawal and insertion of the adjusting mechanism and the probe holder through the enclosure.

BRIEF DESCRIPTION OF THE DRAWINGS

FIG. 1 is a vertical sectional view of a probe mounting structure embodying my invention;

FIG. 2 is a view taken on line 2—2, FIG. 1;

DESCRIPTION OF THE PREFERRED EMBODIMENT

Figure 4:
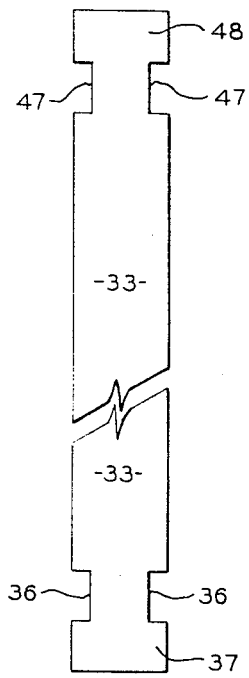
FIG. 4 is an elevational view of the resilient deflectable spring member of the probe adjusting mechanism.

The probe is mounted in a supporting structure having a base member 10 attached to the turbine casing 11 as by screws 12. The base 10 is formed with a hub 13, to which a conduit outlet box 14 is attached by threaded engagement. The box 14 is of circular form being open at one side and formed with a closed rear wall 15. The supporting structure also includes a tubular member 17 fixedly secured in the base and extending inwardly of the casing toward the shaft 20.

A probe holder 21 is mounted in the lower end of the tubular member 17 and is dimensioned for snug sliding engagement therewith. The probe holder 21 is formed with an internally threaded bore to receive the probe 23. The probe 23 functions to detect vibration in the shaft 20 and has an end portion 25 located in proximity to the shaft. The probe is connected to instrumentation through a conductor 27.

The upper portion of the probe holder 21 is cut away to provide a semicircular upstanding portion 30 formed in its sides with notches 31.

Probe adjusting means is provided for moving the probe in the tube 17 axially thereof toward and from shaft 20. The adjusting means includes a resilient deflectable member which may take the form of a flat strip 33 of spring material. The strip 33 is formed in proximity to the lower end thereof with notches 36 forming a "T" head portion 37. The axial dimension of the "T" head portion 37 is comparable to the axial dimension of the notches 31 in the upper portion 30 of the probe holder 21.

The "T" head portion 37 is inserted in the notches 31 and the sides of the portion 30 may be swaged over in areas indicated at 40, FIG. 2, to fixedly secure the spring member 33 to the probe holder 21.

The mechanism for adjusting the probe holder 21 also includes an upper rigid member 43. The member 43 is of substantial thickness compared to the spring member 33. At its lower end, it is formed with a slot in between side portions 45, see FIGS. 2 and 5. The upper end portion of the spring member 33 is formed in its sides with notches 47 similar to the notches 36 forming a "T" head portion 48. The member 43 is relieved above the side portions 45 to provide a "T" shaped area for the reception of the "T" head portion 48 of the member 33. The neck portion of the member 33, formed by the notches 47, is positioned between the side portions 45, which may also be swaged over at 50 to fixedly secure the spring member to the member 43.

Figure 3:
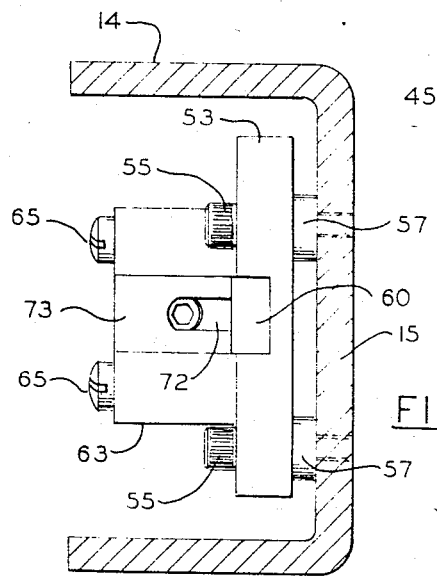
FIG. 3 is a view taken on line corresponding to line 3—3, FIG. 2.
Figure 6:
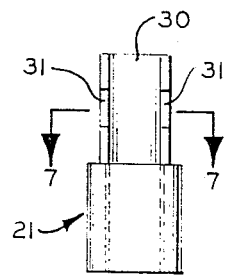
FIG. 6 is an elevational view of the probe holder.
Figure 7:
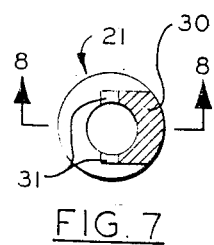
FIG. 7 is a view taken on line 7—7, FIG. 6.
Figure 8:
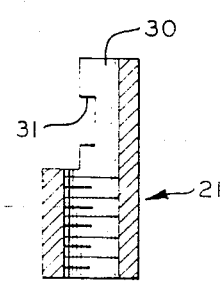
FIG. 8 is a view taken on line 8—8, FIG. 7.

The upper portion of the member 43 is slidably mounted in a slot 51 formed in a circular member 53 fixed to the back wall 15 of the enclosure as by screws 55. The member 53 is spaced outwardly from the rear wall 15 of the enclosure by spacer members 57. The screws 55 extend through the member 53, spacer members 57 and thread into the rear wall 15 of the enclosure, see FIGS. 1 and 3. The slot 51 is disposed vertically, that is, it extends in a direction axially of the tube 17.

Figure 5:
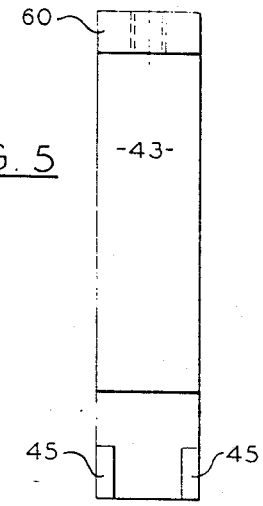
FIG. 5 is an elevational view of the outer member attached to the upper end of the spring shown in FIG. 4.

The upper end portion of the member 43 is bent outwardly as at 60, see FIGS. 1, 2 and 5. The outwardly bent end portion 60 is formed with a threaded aperture to receive the adjusting screw 61. A block 63 is fixed to the member 53 by screws 65. The block 63 is formed with a recess 67 to receive the bent over end portion 60 of the member 43. The adjusting screw is positioned between the upper and lower walls of the recess 67, the lower end of the screw abutting against the lower wall 70. The upper end of the screw is formed with a cylindrical neck portion 71 positioned in a slot 72 formed in the top wall 73 of block 63. This neck portion 71 is formed with a non-circular recess to receive a wrench 75 for effecting rotation of the screw 61 to adjust the member 43 vertically in FIGS. 1 and 2. The screw is formed with an enlargement 74 engaging the underside of the top wall 73. With this arrangement, the screw is restrained against axial movement in block 63.

By rotation of the screw 61, the member 43, spring member 33, and the probe holder 21 are moved axially in the support tube 17 to adjust the sensor end of the probe in proper relation to the shaft 20. The member 43 is locked in adjusted position by a screw 77 threaded into block 63 and having a collar 78 overlying the member 43.

The probe holder may be removed from the support structure by removing the block 63 from the member 53 and removing the clamping screw 77. Thereupon, the adjusting mechanism can be moved outwardly, and due to the resiliency of the member 33, the member 43 can be moved outwardly from the enclosure 14. In other words, as the adjusting mechanism is moved axially outwardly of the tube 17, the member 33 can be deflected from its normal linear form to a curve permitting withdrawal of the probe holder 21. It will be apparent that the probe holder 21 and the probe 23 may be adjusted or may be removed from the machine while it is in operation. The open side of the closure 14 is provided with a cover 80 attached to the box by screws 81.

While I have described the preferred embodiments of my invention, it is to be understood that the invention is not limited thereto but may be otherwise embodied within the scope of the following claims.

I claim:

1. A structure for mounting a detecting probe in proximity to a rotating member journaled for high speed rotation in a machine casing comprising a support structure fixedly mounted in said casing and including a tubular portion extending inwardly thereof toward said rotating member, a probe holder mounted in the inner end of said tubular portion for movement axially thereof, a probe fixedly mounted in said probe holder, probe holder adjusting mechanism operable externally of the outer end of said tubular portion for adjusting said probe holder toward and from said rotating member, said adjusting means including a resilient deflectable member extending lengthwise of said tubular portion and having an end connected to said probe holder, the other end of said member being adjustably secured to said support structure for adjustment of said probe holder toward and away from said rotating member, said other end of said resilient deflectable member being also detachably secured to said support structure for removal of said resilient deflectable member and said probe holder outward through said tubular portion from said support structure.

2. A structure for mounting a detecting probe as set forth in claim 1 wherein said resilient deflectable member consists of an elongated spring normally of linear form.

3. A structure for mounting a detecting probe as set forth in claim 1 wherein said adjusting mechanism includes screw means mounted on said support structure.

4. A structure for mounting a detecting probe as set forth in claim 1 wherein said support structure includes a base member fixed to the machine casing and provided with an enclosure portion, said tubular portion being fixed to said base member and having communication with the interior of said enclosure portion, guide means mounted in said enclosure portion for guiding said adjusting means in a direction axially of said tubular member.

5. A structure for mounting a detecting probe as set forth in claim 4 and including a clamp means for clamping said adjusting means in adjusting position.

* * * * *